United States Patent Office 2,950,293
Patented Aug. 23, 1960

2,950,293

SUBSTITUTED BENZENESULFONYL-HYDRAZONES (N)

Hans Willi Zimmer, Cincinnati, Ohio, assignor to The Chattanooga Medicine Company, Chattanooga, Tenn., a corporation of Tennessee No Drawing. Filed July 1, 1958, Ser. No. 745,824

3 Claims. (Cl. 260—397.7)

The instant invention relates to novel organic compounds, and more particularly, to novel substituted benzene-sulfonylhydrazones.

Although the compounds of the invention may have a number of uses in various fields, they may be found to be particularly useful as sun screen agents, foaming agents and chemotherapeutic agents. A desirable ingredient for "sun tan" lotions is a sun screen agent with high absorption of ultraviolet radiation in the neighborhood of 2970 A. (which wave-length produces undesirable reddening effect on the skin) and low absorption of light radiation in the neighborhood of 3400 A. (which wave-length produces the maximum tanning effect). The instant compounds possess such absorption spectral characteristics.

Also, the instant compounds may undergo decomposition upon melting and such decomposition is accompanied by the evolution of a large volume of gas, so that these compounds may be added to molten plastic or synthetic resin materials to act as foaming agents therefor.

In addition, the compounds of the invention may display anti-bacterial activity comparable to that of the well known sulfa drugs, sulfanilamide and sulfadiazine. In this respect, it should be noted that certain bacteria such as *Streptococcus pyogenes, Micrococcus pyogenes,* and *Escherichia coli* tend to become resistant to the known sulfa drugs, although they may be particularly sensitive to a new sulfa compound. It is believed that exposure of such bacterial to known sulfa drugs often tends to result in the survival of a strain resistant to such sulfa drugs, but still sensitive to a new sulfa drug to which the strain has not yet been exposed. There is thus a great need for new compounds which display anti-bacterial activity.

It is, therefore, an important object of the instant invention to provide new and useful substituted benzene-sulfonyl hydrazones.

It is another object of the instant invention to provide new and useful p-aminobenzenesulfonylhydrazones of certain alkoxy substituted aromatic aldehydes and ketones.

Yet another object of the instant invention is to provide new compounds useful as sun screen agents, foaming agents and/or chemotherapeutic agents.

Other and further objects, features and advantages of the present invention will become apparent to those skilled in the art from the following detailed disclosure thereof.

The instant invention consists in a compound having the following formula:

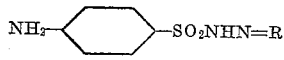

wherein R is a radical containing at least one benzene nucleus having one to three $C_1$—$C_4$ alkoxy substituents containing a total of at least 2 C's.

As indicated, the compounds of the invention are p-aminobenzenesulfonylhydrazones of certain substituted aromatic aldehydes or ketones.

In each case, these aldehydes or ketones contain at least one benzene nucleus having one to three alkoxy substituents. The total number of carbon atoms in such alkoxy substituents must be at least two. Each alkoxy substituent is a $C_1$—$C_4$ alkoxy group. In addition to the benzene nucleus in the radical R, there is an aliphatic group. Such aliphatic group is a "linking" $C_1$—$C_6$ hydrocarbon group connecting the benzene nucleus with the hydrazine N.

Expressed in other terms, the compound of the invention may have the formula:

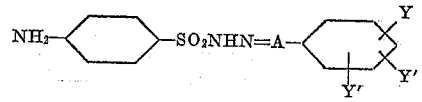

wherein A is a trivalent aliphatic $C_1$—$C_6$ hydrocarbon group, Y is OX, each Y' is H or OX, each OX is a $C_1$—$C_4$ alkoxy group and the total number of C's in Y plus both Y's is at least 2. Thus, if both Y's are H, Y must be a $C_2$—$C_4$ alkoxy group such as ethoxy, isopropoxy or butoxy. If Y is methoxy, then at least one Y' must be a $C_4$—$C_1$ alkoxy group.

The alkoxy groups may be methoxy, ethoxy, n-propoxy, isopropoxy, n-butoxy, etc. The group A may have such structures as:

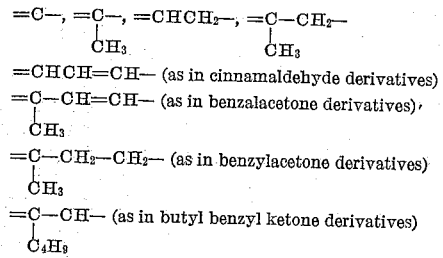

Typical compounds of the invention include the following:

p-aminobenzenesulfonylhydrazone of o-ethoxybenzaldehyde:

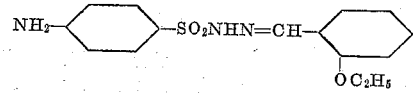

p-aminobenzenesulfonylhydrazone of p-butoxybenzaldehyde:

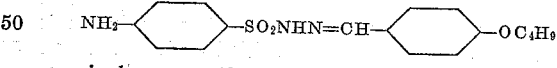

p-aminobenzenesulfonylhydrazone of 3,4,5-trimethoxybenzaldehyde:

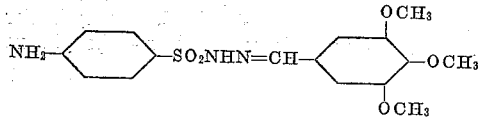

p-aminobenzenesulfonylhydrazone of veratraldehyde:

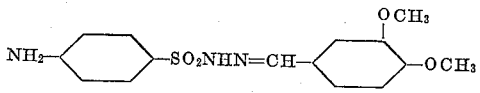

p-aminobenzenesulfonylhydrazone of 2-methoxy-5-ethoxybenzaldehyde:

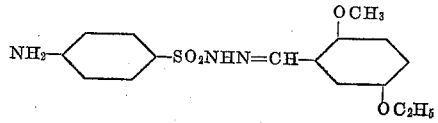

p-aminobenzenesulfonylhydrazone of m-ethoxycinnamaldehyde:

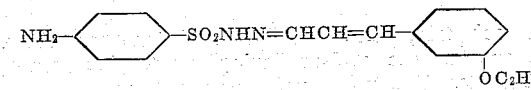

p-aminobenzenesulfonylhydrazone of 3,4,5-trimethoxybenzylacetone:

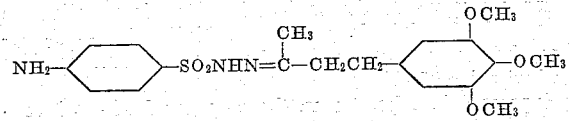

p - aminobenzenesulfonylhydrazone of p - ethoxybenzyl butyl ketone:

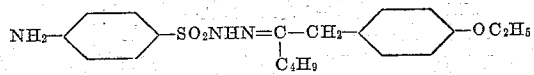

p - aminobenzenesulfonylhydrazone of o - ethoxybenzalacetone:

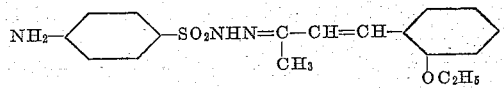

The compounds of the instant invention are prepared by reacting the aldehyde or ketone with the p-aminobenzenesulfonylhydrazine. The reaction is carried out advantageously in a solvent; and the solvents preferred for use are water, alcohol, dioxane or mixtures thereof. The instant hydrazine is relatively insoluble in solvents; and the reaction is facilitated by the application of external heat and stirring. The selected hydrazine is first placed in the solvent and heat is applied with stirring so as to obtain a solution or slurry; then substantially an equal molar quantity of the aldehyde or ketone is added, preferably a small amount at a time with stirring, until the reaction is completed, as evidenced by a homogeneous appearance of the reaction mixture. The entire reaction period is only 5 to 10 minutes ordinarily. The product separates from the reaction mixture and cooling to room temperature and may be easily separated therefrom; and the crude product may be recrystallized from alcohol, water, dioxane or a mixture thereof to yield a relatively pure product.

*Example 1* p-Aminobenzenesulfonylhydrazine (0.025 mol) is dissolved in 50 ml. of hot methanol mixed with 50 ml. of hot water. A charge of o-ethoxybenzaldehyde (0.025 mol) is added to the solution with stirring; and the reaction mixture is permitted to cool to room temperature, as a precipitate separates therefrom. The precipitate is collected on a suction filter and dried at 95° C. in an oven. The crude product is recrystallized from hot methanol to which a little water has been added and the resulting product is a white crystalline material melting with decomposition at 170–171° C. Analysis for p-aminobenzenesulfonylhydrazone of o - ethoxybenzaldehyde: Calculated for $C_{15}H_{17}N_3O_3S$ is $C=56.41$, $H=5.36$, $N=13.16$; and found: $C=56.29$, $H=5.53$, $N=12.90$. The instant product is found to exhibit anti-bacterial activity with respect to *Streptococcus pyogenes*.

The p-aminobenzenesulfonylhydrazones of other aldehydes and ketones such as p-butoxybenzaldehyde, veratraldehyde, m - ethoxycinnamaldehyde, p -ethoxybenzyl butyl ketone or o-ethoxybenzalacetone may be prepared by carrying out a procedure that is the same as that just described except that the selected aldehyde or ketone is employed.

*Example 2*

A procedure is carried out that is the same as that described in Example 1, except that 3,4,5-trimethoxybenzaldehyde is used in place of the o-ethoxybenzaldehyde and the product obtained is a white crystalline material melting with decomposition at 167.5–168° C. Analysis for p-aminobenzenesulfonylhydrazone of 3,4,5-trimethoxybenzaldehyde: Calculated for $C_{16}H_{19}N_3O_5S$ is $C=52.59$, $H=5.24$, $N=11.50$; and found: $C=52.52$, $H=5.18$, $N=11.26$.

The compounds of the invention just described show peak absorptions of light radiation in the neighborhood of 2970 A. and low absorption of light radiation in the neighborhood of 3400 A. so that they may be used in sun tan lotions. These compounds also undergo decomposition upon melting.

It will be understood that modifications and variations may be effected without departing from the spirit and scope of the novel concepts of the present invention.

I claim as my invention:

1. A compound having the following formula:

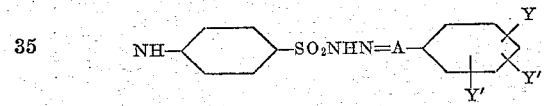

wherein A is a trivalent aliphatic $C_1$—$C_6$ hydrocarbon group, any unsaturation in the radical A being olefinic, Y is selected from the class consisting of $CH_3O$—, $C_2H_5O$—, $C_3H_7O$—, and $C_4H_9O$—, and each Y' is selected from the class consisting of H, $CH_3O$—, $C_2H_5O$—, $C_3H_2O$—, and $C_4H_9O$—; the total number of C's in Y, Y' plus Y' being at least two.

2. p-Aminobenzenesulfonylhydrazone of o-ethoxybenzaldehyde.

3. p-Aminobenzenesulfonylhydrazone of 3,4,5-trimethoxybenzaldehyde.

References Cited in the file of this patent

UNITED STATES PATENTS 2,912,445     Zimmer               Nov. 10, 1959

OTHER REFERENCES

Lehmann: Bull. Chim. Belges, vol. 55, p. 84 (1946).
Curtius et al.: J. prakt. Chem., vol. 112 (1926) p. 132.
Chemical Abstracts, vol. 41, pp. 5474–5477 (1947) [Abstracts of Lehmann et al., Bull. Soc. Chim. Belges, vol. 55, pp. 52–97 (1946)].